United States Patent [19]

Bridge

[11] Patent Number: 5,385,368
[45] Date of Patent: Jan. 31, 1995

[54] SELF CONTAINED, PORTABLE, PROTECTIVE SAFETY AIR BAG

[76] Inventor: Herbert H. Bridge, c/o Hitching Post Resort, 100 Barefoot Williams Rd., Naples, Fla. 33962

[21] Appl. No.: 125,304

[22] Filed: Dec. 20, 1993

[51] Int. Cl.⁶ .............................. B60R 21/18
[52] U.S. Cl. ........................ 280/733; 441/94
[58] Field of Search ............... 280/733, 801, 808; 441/92, 93, 94

[56] References Cited

U.S. PATENT DOCUMENTS 3,426,942  2/1969  Mc Mains et al. ............... 441/94
4,971,354  11/1990  Kim ............................. 280/733

FOREIGN PATENT DOCUMENTS 2262720  6/1993  United Kingdom ............... 280/733

Primary Examiner—Karin L. Tyson
Attorney, Agent, or Firm—Robert J. Doherty

[57] ABSTRACT

An airbag safety assembly adapted for independent use in vehicles which includes a jacket which in turn houses an inflatable airbag and means for inflating the airbag by relative elongation of an elastic connector disposed between the jacket and portions of a seat belt which are in turn adapted for connection to spaced mounting points in the vehicle such that the assembly can be utilized in vehicles with or without integral restraint systems.

7 Claims, 4 Drawing Sheets

SELF CONTAINED, PORTABLE, PROTECTIVE SAFETY AIR BAG

BACKGROUND AND OBJECTS OF THE INVENTION

This invention relates to a vehicle airbag safety system that is completely independent of the vehicle except for its connection to upper and lower vehicle attachment mounts at their opposite ends. The device is adapted to protect the wearer if the vehicle is involved in a collision or other event that would throw the user against the system with a force above a predetermined level.

Existing vehicle airbag restraint systems are presently mounted integrally with the vehicle, e.g., in the dashboard or steering wheel of an automobile. There is, however, a need for a system which is portable in that it can be utilized in any vehicle which although equipped with standard type seat belts including the mounts therefore, is not equipped with airbags. Further even with those vehicles equipped with airbags, it would be desirable to have a secondary airbag system that could be used in conjunction with such vehicles.

These and other objects of the invention are accomplished by the provision of an elongated jacket in which an airbag is disposed and which includes an elastic strap at least one end thereof which in turn is connected to a seat belt portion such that when a tension above a predetermined force is applied to the strap, as by the user being thrown against it, the strap will elongate and in turn actuate means for inflating the airbag.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 2:
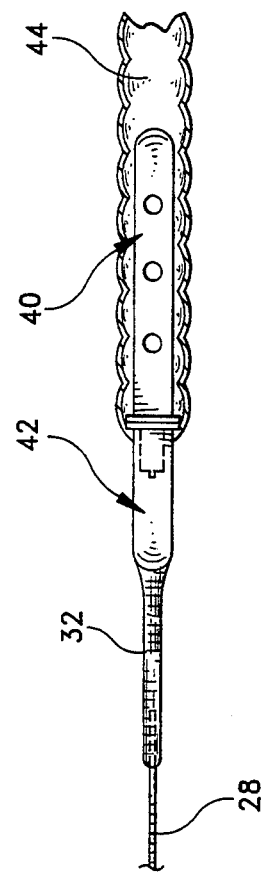
FIG. 2 is a partial side view of FIG. 1 but with the jacket removed which shows the expanding elastic strap that is attached to the seat belt portion and the airbag.
Figure 4:
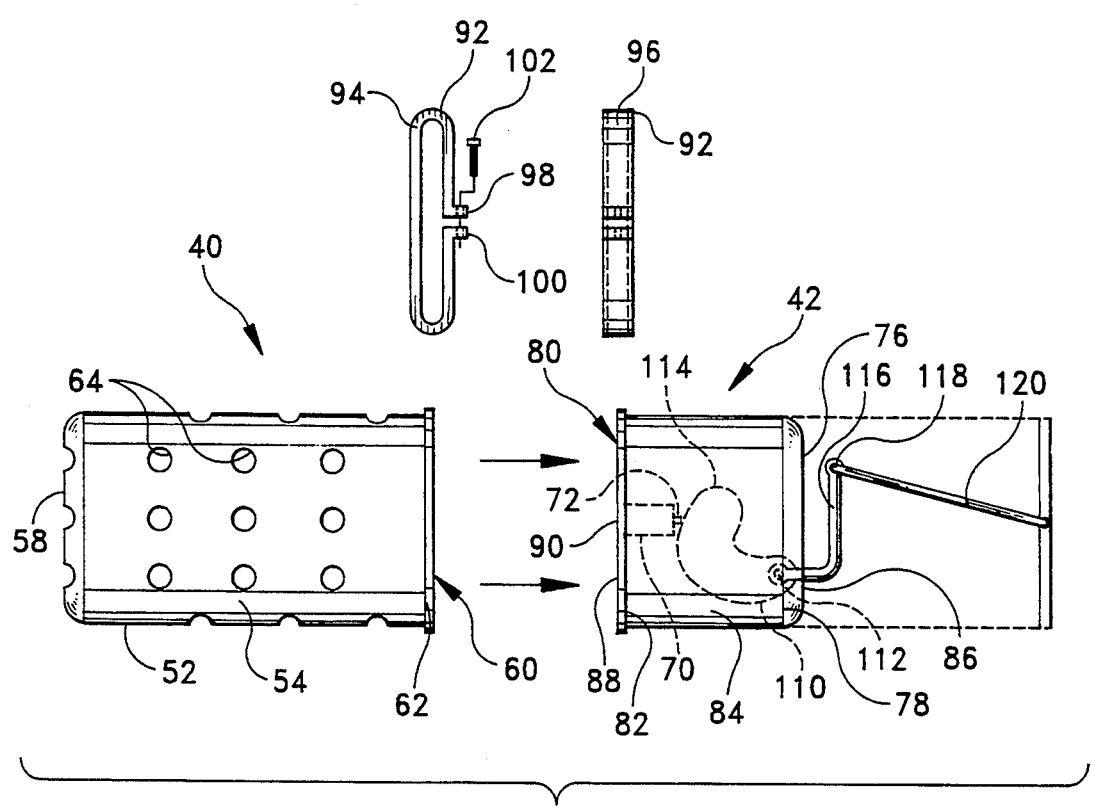
FIG. 4 is a top assembly view of FIG. 3 which also shows the retaining band that secures the housing parts together.
Figure 5:
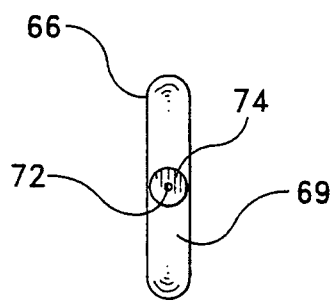
FIG. 5 is an end view of an expansion cartridge.
Figure 6:
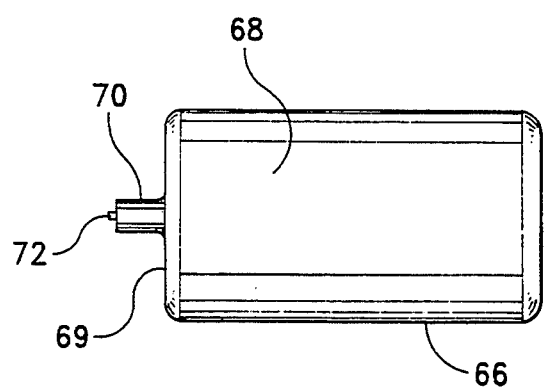
FIG. 6 is a top view of an expansion cartridge.

When an occupant of a car, train or other vehicle is thrown forward, such action puts pressure on the seat belt thus tensioning the elastic strap and thus causes the elastic strap (FIG. 2) to elongate. When such force exceeds a predetermined level, this elongation of the strap will pull the cord connector a distance sufficient to activate the firing arm cam that fires the $CO_2$ charge. The airbag is housed in an airbag jacket with an exit slot. Once the device is actuated, it can be restored to a re-use position by the occupant. The expended $CO_2$ cartridges once used can be replaced with a new charge cartridge by simply taking the plastic housing apart and inserting a new charge.

The self contained airbag generally made of nylon fits inside the jacket which is part of the seat belt and has a slot across the middle that allows it to escape when fired. There is a $CO_2$ cartridge at each end of the jacket both of which are in a plastic housing that can be taken apart to put in new charges. The firing housing arm has a nylon cord that is attached to the elastic strap which elongates when the person is thrown forward.

A unique feature of this system is a firing mechanism that is in collocation with the seat belt. The bag is housed in a jacket with an exit slot that allows it to escape and inflate when the occupant is thrown forward expanding the elastic strap that pulls the firing pin cord connector. It is activated through a $CO_2$ charge in an airbag located in front of the vehicle occupant protecting the occupant from serious injury in the event of a collision. The airbag is attached to the shoulder strap making it completely independent of the vehicle.

The elastic strap is sewn onto the seat belt between the firing pin and the cord connector. When the occupant is thrown forward, such action puts an elongating force on the elastic strap thus pulling the cord connector that in turn fires the $CO_2$ charge.

Figure 8:
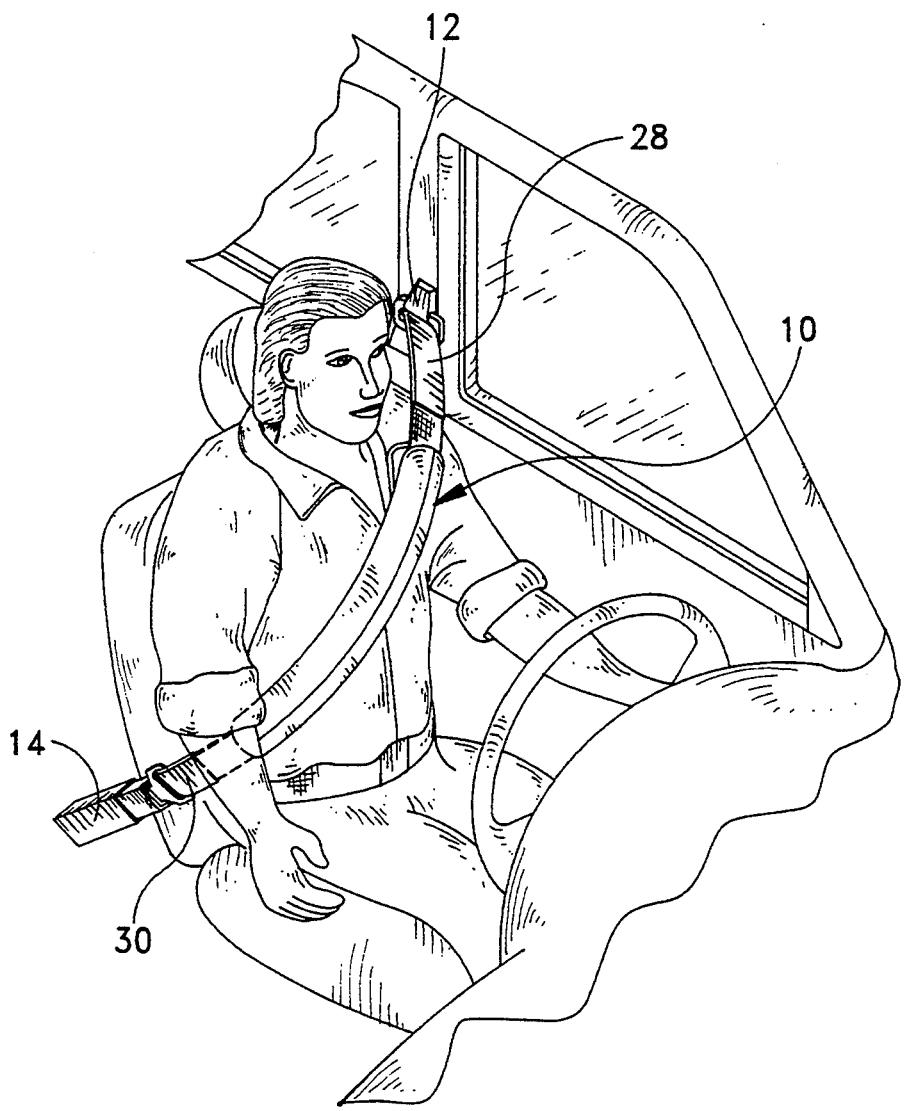
FIG. 8 is a perspective view showing one form of the device of the present invention in use.

Specifically referring to the drawings, FIG. 8 shows the device 10 of this invention mounted in a vehicle such as the front seat of an automobile between the vehicle mounting points such as the upper and lower vehicle mounts 12 and 14 respectively. The device has particular utility as the replacement for the upper seat belt run of a standard three-point combination seat belt and shoulder harness or strap as shown in FIG. 8 but could be otherwise attached or positioned with respect to the user occupant.

Figure 1:
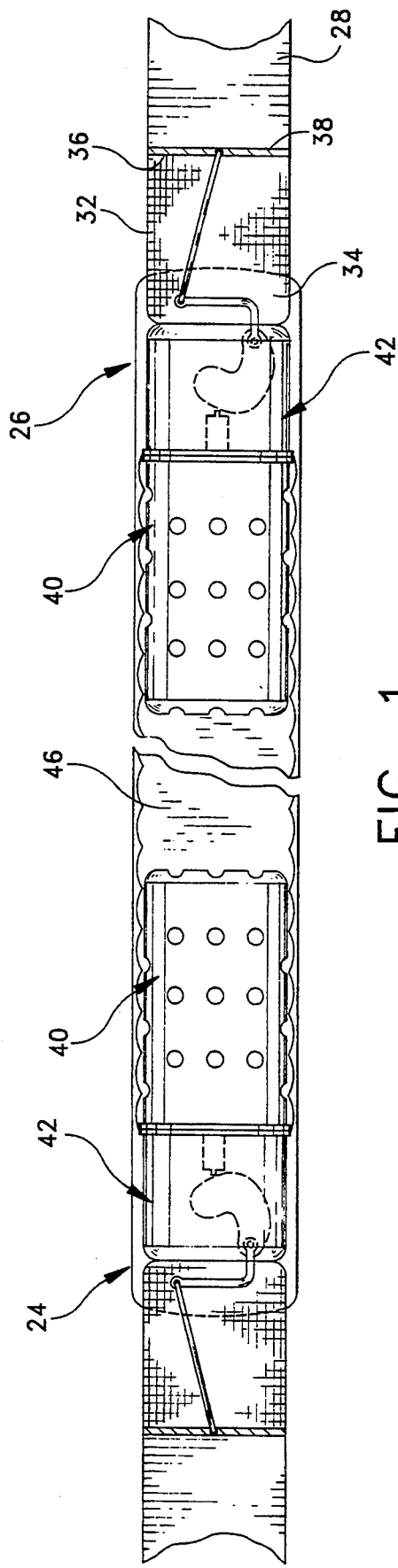
FIG. 1 is a top plan view with parts removed which shows the double cartridge in an airbag jacket with the firing mechanism cord attached to the elastic strap.
Figure 3:
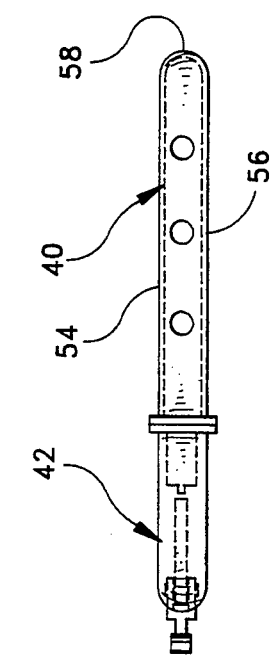
FIG. 3 is a side view of the activation and inflation assemblies connected to each other and shows the two-part plastic housing which holds the firing pin, cam and cartridge.
Figure 7:
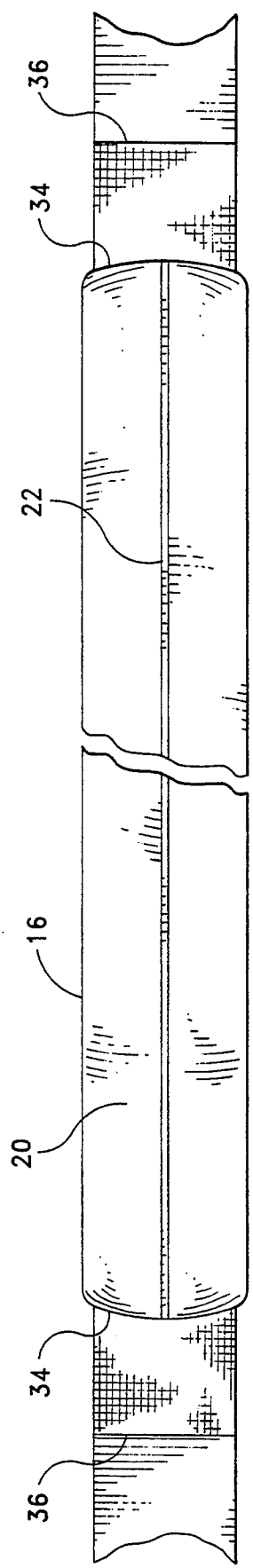
FIG. 7 is a top plan view similar to FIG. 1 which shows the airbag jacket with the airbag exit slot therefore.
Figure 9:
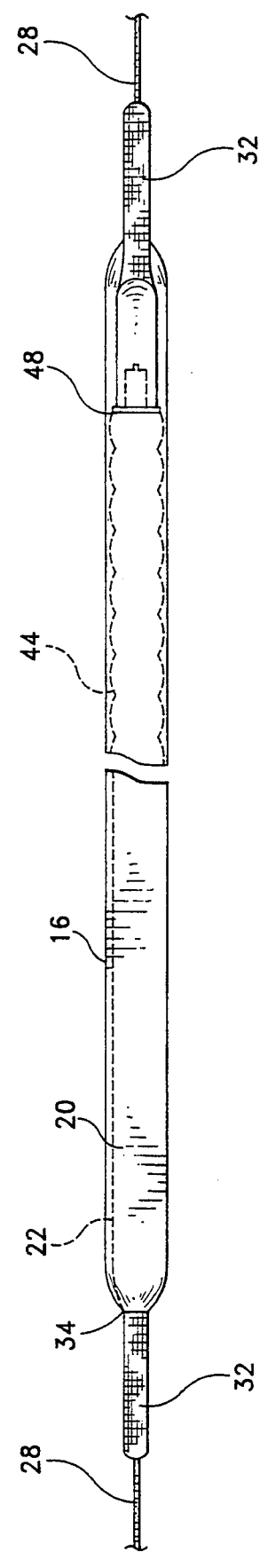
FIG. 9 is a side view of the device shown in FIGS. 1 and 7 with parts partially removed for clarity.

As best shown in FIGS. 1 and 7, the device 10 includes an elongated generally flat jacket 16 formed of a protective material such as a strong fabric, a rubber-like material such as Gore-Tex and the like so that it will withstand abrasion, general wear and is easy to clean of soil. The jacket 16 includes a bottom surface 18 and an opposed top surface 20 in turn provided with an elongated slot or opening slit 22. The opposed ends 24 and 26 of the jacket are attached to upper and lower belt portions or runs 28 and 30 respectively by means of an elastic strap or web 32 disposed therebetween and attached to both the jacket ends and the seat belt portions. Generally the strap 32 which includes a proximate end 34 and a distal end 36 is attached to the seat belt runs by sewing, heat sealing, etc. along an attachment line 38. The proximal ends 34 can also be attached to the jacket ends 24 and 26 respectively by the same procedures.

Positioned within the jacket 16 at each end 24 and 26 is a two-piece combination expansion assembly 40 and activation assembly 42 in operational association with an airbag 44 in turn having an elongated body 46 and opposed ends 48 and 50 adapted to receive the expansion assemblies and secured thereto. The expansion assembly 40 includes a rigid housing 52 of flat cup-like configuration with opposed side and end walls 54 and 56 respectively, a bottom wall 58 and a front opening 60 surrounded by a raised peripheral lip 62. The housing 52 includes a plurality of holes 64 and is adapted to receive a cartridge 66 containing pressurized gas such as $CO_2$ or the like. Such cartridge 66 includes a body 68, a top shoulder 69 and a projecting neck 70 in turn including an activation or firing pin 72 extending outwardly of the open end 74 of the neck 70.

A rigid housing 76 of similar configuration to the housing 52 in part comprises the activation assembly 42. The housings 52 and 76 can be formed of any suitable materials such as plastic. The housing 76 includes a cup-like body 78, a front opening 80 surrounded by a peripheral lip 82 and side and end walls 84, 86. Preferably the front opening is partially closed by a front wall 88 adapted to contact the shoulder 69 and in turn including a central hole 90 for receipt of the cartridge neck 70. In this way when the two housings 52 and 76 are fastened together as by a retaining band 92, the cartridge is fixedly positioned in such assemblies. The band has a body 94 including an inner peripheral groove 96 adapted to receive the face to face lips 62 and 82 and a pair of opposed tabs 98 in turn including threaded bores 100 adapted to receive a set screw 102 such that the housings 52 and 76 are joined. Preferably the respective open ends 48, 50 of the elongated airbag 44 is also adapted to be placed into the jacket and extend over the body of the housing 52 and extend over the lips 62, 82 such that the band 92 attaches the bag to the housing. The airbag includes a fabric, e.g. nylon, body 46 adapted to be expanded by the firing of the gas cartridge and thus extensively exit the jacket via slot 22.

The activation assembly further includes a cam 110 pivotally mounted to the spaced side walls of the housing 76 by a pin 112 and adapted to engage the firing pin 72 with a rearwardly extending lobe 114 when rotated clockwise as shown in the drawings. A rigid arm 116 extends forwardly from the cam 110 and is connected at its free end 118 to an non-extensible cord 120 formed of nylon, metal wire or other suitable material. The cord 120 and the arm 116 may extend through the elastic strap 32 and in this way are thus positioned by the strap but are also adapted to move independent of the strap at least to the extent that they exhibit movement differing from a straight elongation movement of the strap. In this regard when the device system is subjected to an elongation force as by the occupant being thrown forwardly against the jacket, the strap or straps stretch and elongate and thus carry the cord to the left as shown in the drawings a distance proportional to the force (e.g., FIG. 2). When the force reaches a predetermined level, enough movement is achieved by the cord to operate the cam so its rear lobe activates the firing pin thus causing expanding gas to exit the cartridge via the neck thereof and then through the holes 64 provided for such purpose and then into the interior of the airbag thus causing its inflation. The cord may also be attached to its proximal belt portion as by sewing or other fastening of its end 122 to the attachment line 38.

It is thus apparent that the objects of the invention have been achieved by the provision of the above-described device. It should be pointed out that variations of this device may be utilized and are included in the attached claims such as providing a pair of airbags positioned end to end in the jacket and separately activated by the activation and expansion assemblies at each jacket end instead of one air bag being expanded by one or both expansion assemblies as specifically contemplated above or that only one activation and expansion assembly need be present which in the latter situation would require one rather than both elastic connecting straps. Also the expansion means need not be in the form of a compressed gas cartridge but could include a cartridge in which a compound rapidly burns to produce expansion gas. Another modification expressly contemplated is that the jacket could be made entirely of a rubber or other expandable material or at least the opposed ends thereof such that the elongation force would stretch those end portions in which the activation assembly was housed and thus trigger the inflation sequence. In other words, the claims include an elastic connector which is an integral part of the jacket.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A vehicle safety device for attachment to a vehicle having fixed upper and lower attachment points, said device comprising a longitudinally oriented jacket having opposed ends and an interior space and having opposed ends and a longitudinally oriented inflatable airbag having opposed ends disposed in end to end relation within said interior jacket space, upper and lower belt portions each having opposed ends with one of each of said opposed ends adapted for respective connection to said upper and lower attachment points and the other ends of each of said belt portions connected to said jacket opposed ends with said jacket disposed intermediate said other ends of said belt portions, at least one of said jacket and belt portion end connections including a longitudinally extendible elastic connector disposed between said at least one jacket and belt portion ends, said at least one jacket end including expansion means operatively connected to said airbag for inflating said airbag, activation means for activating said expansion means, said actuation means in part including a non-elastic activation member supported by said elastic connector and longitudinally movable therewith such that when said elastic connector is longitudinally extended a predetermined distance wherein the accompanying longitudinal movement of said activation member activates said expansion means to inflate said airbag.

2. The device of claim 1, said jacket including an open longitudinally directed slot for enabling said airbag to expand outside said jacket interior space.

3. The device of claim 1, said activation and expansion means including a separable two-part rigid housing fixedly disposed in said at least one jacket end, said housing supporting and positioning said expansion means and said activation means such that after activation said expansion means can be replaced.

4. The device of claim 3, said two-part rigid housing including a first part and a second part, said first part disposed in said jacket one end and in part housing said activation means, said first part including a cam mounted for pivotal motion, said cam having means for activating said expansion means and in turn operatively connected to said activation member so that longitudinal movement of said activation member pivots said cam so that said activation means activates said expansion means.

5. The device of claim 4, said activation member being a non-elastic cord having opposed ends and connected to said cam at one end and to said one belt portion other end.

6. The device of claim 4, said second rigid housing part connected to said first part by a retaining band, one of said ends of said inflatable bag extending over said housing second part and under said band so as to fix said one end of said bag with respect to said jacket.

7. The device of claim 1, there being activation and expansion means at both ends of said jacket and airbag.

* * * * *